Dec. 22, 1931.  F. A. FURLONG  1,838,018
MEASURING APPARATUS
Filed Dec. 23, 1926  2 Sheets-Sheet 2

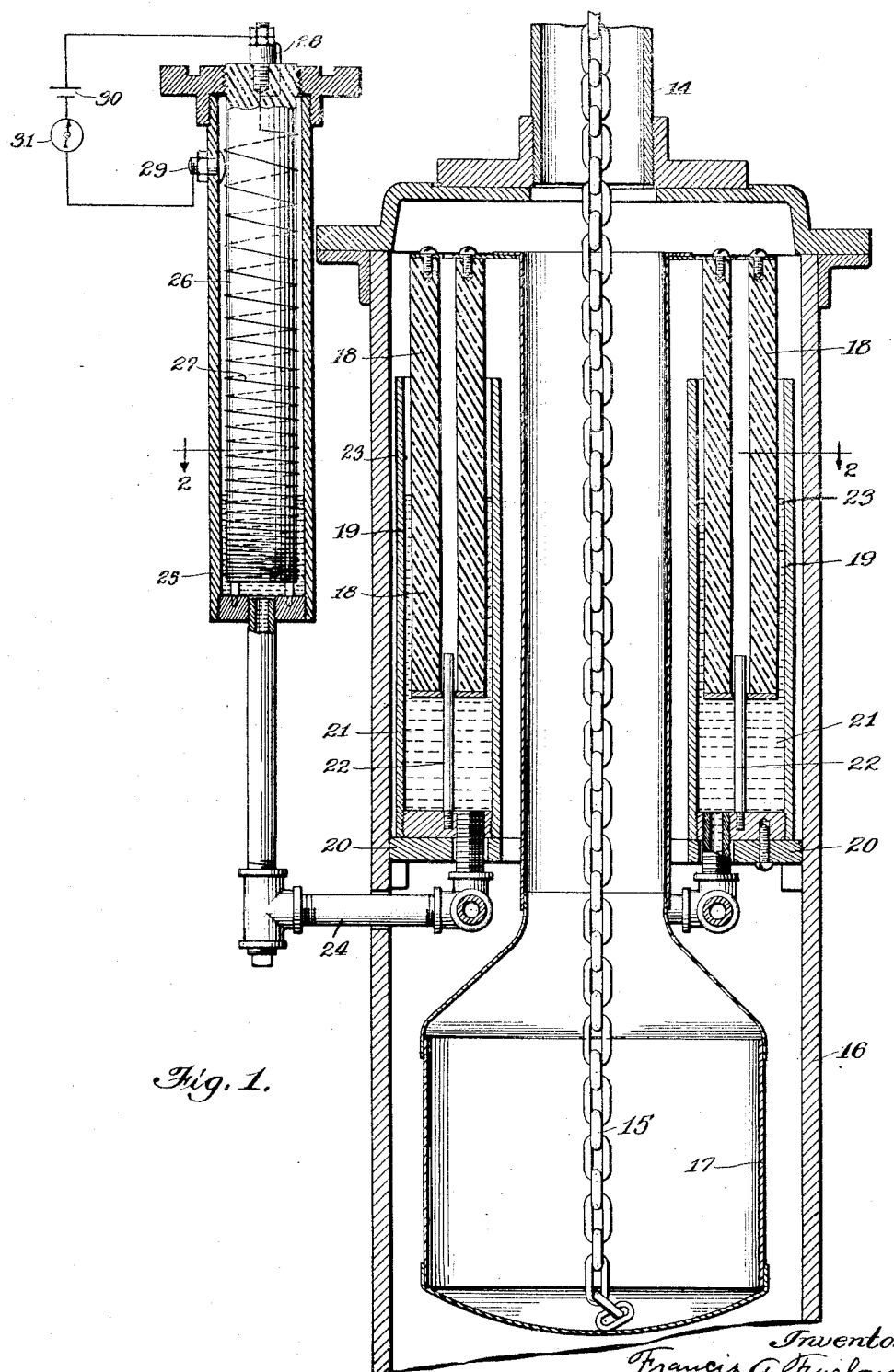

Inventor
Francis A. Furlong
By Nissen & Crane
attys.

Patented Dec. 22, 1931

1,838,018

UNITED STATES PATENT OFFICE

FRANCIS A. FURLONG, OF CHICAGO, ILLINOIS, ASSIGNOR TO REPUBLIC FLOW METERS COMPANY, OF CHICAGO, ILLINOIS, A CORPORATION OF ILLINOIS

MEASURING APPARATUS

Application filed December 23, 1926. Serial No. 156,624.

This invention relates to mechanism for utilizing variations in weight to register electrically variable quantities and has for its object the provision of such mechanism which shall be simple, efficient, economical and of improved construction and operation. Other objects will appear from the following description.

The invention is exemplified in the combination and arrangement of parts shown in the accompanying drawings and described in the following specification, and it is more particularly pointed out in the appended claims.

In the drawings—

Fig. 1 is a vertical sectional view of a portion of a meter body embodying one form of the present invention;

Figure 3:
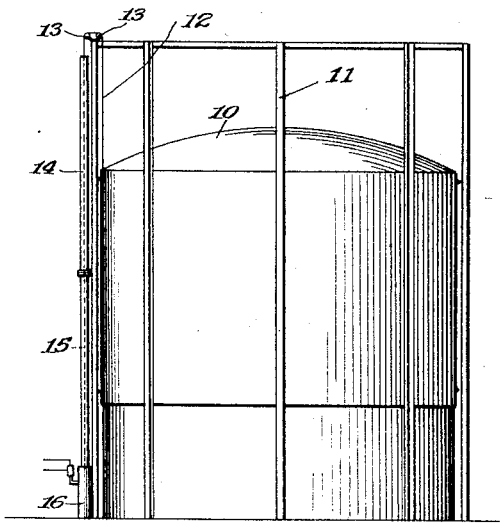
Fig. 3 is an elevation showing one application of the present invention.
Figure 2:
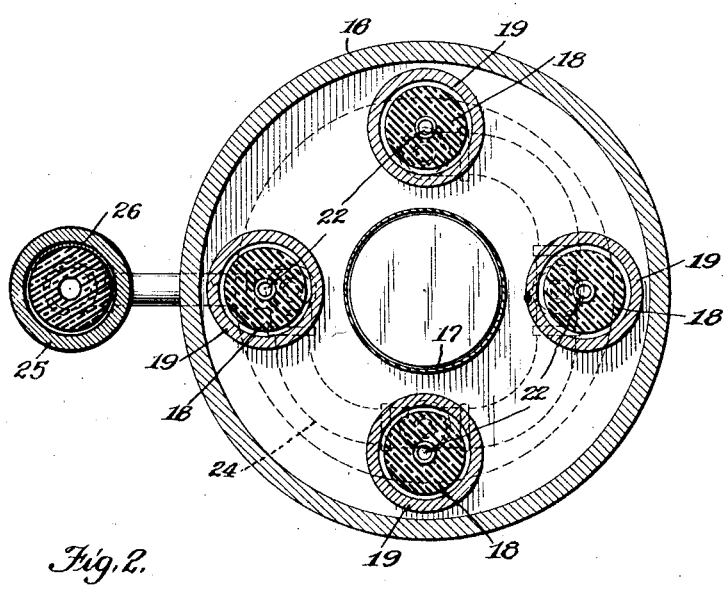
Fig. 2 is a transverse section on line 2—2 of Fig. 1.

There are many variable quantities that are of such nature that it is comparatively easy to produce a variation in weight proportional to the variation in the quantity in question. The present invention provides means for electrically registering variations in weight and through such variations to register other quantities which vary proportionally to the weight. As an illustration of an application of the present invention, there is illustrated in the drawings the manner of applying the invention to storage tanks for gas. Such tanks, as is well known and as is illustrated in Fig. 3, have telescoping parts which move up and down as the quantity of gas increases or decreases. In the manufacture and distribution of gas, it is exceedingly desirable to be able to ascertain readily at any time the quantity of gas in the storage tanks. The tanks themselves are usually not visible from the position where the production and distribution is controlled and it is therefore desirable to be able to transmit the information so that it is indicated at any convenient position.

In Fig. 3, the numeral 10 designates the upper section of a telescoping storage tank for gas surrounded by the usual skeleton frame 11. A cable 12 is attached to the upper portion of the tank 10 and extends upwardly over guide pulleys 13 and downwardly through a protective pipe or housing 14. The lower end of the cable 12 supports a chain 15 which extends into a housing 16 of a meter body. The cable 12 and chain 15 are so proportioned that when the telescoping section 10 is in its uppermost position, the upper end of the chain 15 will be near the top of the meter housing 16 and when the telescoping section is in its lowermost position, the chain 15 will be almost completely withdrawn from the meter housing.

Within the housing 16, there is provided a basket or chain receptacle 17 into which the chain is directed by the pipe 14. The lower end of the chain rests in the receptable 17 when the holder or telescoping section 10 is at its lowermost position and the excess chain collects in the receptacle as the holder 10 rises. The receptacle 17 is of sufficient size to contain all of the excess chain when the holder 10 is at its uppermost position. It will be apparent that the weight of the chain resting in the receptacle 17 will be proportional to the height of the holder 10. The receptacle 17 is supported on a plurality of floats or plungers 18 which extend into cylinders 19 supported on a platform 20 carried on the interior of the housing 16. The floats 18 rest on a conducting liquid 21, such as mercury, disposed within the cylinders 19. Guide rods 22 may be arranged to properly direct and position the lower ends of the plungers 18. It will be apparent that as the weight of the chain 15 increases in the collector 17, the plungers 18 will be forced downwardly, causing the mercury to rise in the annular space 23 surrounding the plungers. The cylinders 19 are all connected by a pipe 24 with a cylinder or standpipe 25 and it will be apparent that the mercury level in the stand-pipe 25 will be the same as that in the various cylinders 19. Within the cylinder 25 there is arranged a variable rheostat which may be of any suitable form to be varied by the mercury within the cylinder. In the present instance, the rheostat is illustrated as comprising a core member 26 of insulating material upon which a resistance element 27 is wound. The lower end of the element is secured to the lower end of the core member 26 and the upper end is connected to a binding post 28. A terminal 29 is attached to the cylinder 25 and will therefore be connected to the mercury within the cylinder and consequently to the lower end of the winding 27. The terminals 28 and 29 are connected thru any suitable source 30 of constant potential and an indicating or recording instrument 31 is arranged in the circuit to register the current flowing. It will be readily apparent that as the holder 10 rises, the weight of the container 17 will increase which will, in turn, depress the displacement pistons 18 and cause the mercury level to rise. This will decrease the resistance of the rheostat by short-circuiting more of the windings of the coil 27 which, in turn, will permit an increase in the current flowing. The resistance 27 is so disposed along the core 26 that the reading of the instrument 31 will be proportioned to the quantity of gas in the tank 10 and the instrument 31 may be calibrated, if desired, to indicate directly the cubic feet of gas in the tank 10, or any other units of gas measurement.

Many other applications of the instrument will readily suggest themselves to those skilled in the art, as well as variations in the details of construction which fall within the spirit and scope of the invention, as pointed out in the appended claims.

I claim:—

1. The combination with a member arranged to move as a function of a variable quantity, of a weight-actuated member, means controlled by said first-named member for varying the weight applied to said weight-actuated member in proportion to both the increase and decrease in magnitude of the variable quantity, and means controlled by the movements of said weight-actuated member for registering a function of said variable quantity.

2. The combination with a member arranged to move as a function of a variable quantity, of a weight-actuated member, means controlled by said first-named member for varying the weight applied to said weight-actuated member in proportion to both the increase and decrease in magnitude of the variable quantity, and electrical means for registering movements of said weight-actuated member to register variations in a function of said variable quantity.

3. The combination with a receptacle, of conducting liquid contained in said receptacle, a weight-actuated displacement member engaging said liquid, means for varying the weight applied to said weight-actuated displacement member in proportion to the fluctuations in magnitude of a variable to be measured, a rheostat controlled by the surface level of the liquid in said receptacle, and an electrical instrument in circuit with said rheostat for registering a function of said variable.

4. The combination with a receptacle, of a conducting liquid disposed within said receptacle, a displacement member supported by the liquid in said receptacle, means for applying a variable weight to said displacement member, the amount of weight applied being a function of and varying proportionally with change in magnitude of a quantity to be measured, a rheostat having contacts engaged by the liquid displaced by said displacement member, a source of constant potential in circuit with said rheostat, and an electrical measuring instrument in circuit with said rheostat and source of potential for indicating a function of said variable.

5. The combination with a member arranged to move as a function of a variable, of a flexible member supported in upright position and connected with said first-named member to be moved up and down by said first-named member, a receptacle for receiving the lower portion of said flexible member and for supporting variable portions thereof as said flexible member is moved up and down, and means actuated by the weight of the portion of said flexible member supported in said receptacle for registering a function of said variable.

6. The combination with a receptacle for receiving variable weights, of means actuated by said receptacle for indicating a function of the weight supported thereby, a flexible member suspended above said receptacle in position to have the lower portion thereof collected therein as said flexible member is lowered, and means for raising and lowering said flexible member as a function of a quantity to be measured.

7. The combination with a weight receiving receptacle, of a float for supporting said receptacle, a flexible member suspended above said receptacle in position to deposit varying portions of said flexible member in said receptacle as said flexible member is raised and lowered, means for raising and lowering said flexible member as a function of a variable quantity, and electrical means for registering the variation in the height of said float.

8. The combination with a weight-receiving receptacle, of a chain supported above said receptacle with the lower end thereof extending into said receptacle, means for raising and lowering said chain to permit variable portions thereof to rest on said receptacle, a float for supporting said receptacle, conducting liquid supporting said float, and electrical means controlled by liquid displaced by said float for registering a function of said raising and lowering means.

9. The combination with a receptacle, of a float having portions disposed at opposite sides of said receptacle for supporting said receptacle, means for depositing a variable weight in said receptacle, and means controlled by said float for registering a function of the weight deposited in said receptacle.

10. The combination with a receptacle, of a plurality of floats disposed about said receptacle for supporting said receptacle, means for depositing a variable weight in said receptacle, a rheostat controlled by liquid displaced by said floats, and a registering instrument in circuit with said rheostat.

11. The combination with a weight receiving receptacle, of a plurality of vessels disposed about said receptacle, conducting liquid in said vessels, displacement members floated on said liquid and supporting said vessels, means for depositing a variable weight in said receptacle, a rheostat controlled by the liquid displaced by said displacement members, and an electrical instrument in circuit with said rheostat.

12. The combination with a weight receiving receptacle, of a vessel containing conducting liquid, a displacement member floated on said liquid and supporting said vessel, a stand-pipe connected with said vessel at a position removed therefrom, a rheostat controlled by the surface level of the liquid in said stand-pipe, and a registering instrument in circuit with said rheostat.

13. The combination with a weight receiving receptacle, of a plurality of vessels disposed about said receptacle, conducting liquid contained in said vessels, plungers supported on the liquid in said vessel and supporting said receptacle, means for depositing a variable weight in said receptacle as a function of the quantity to be measured, a common stand-pipe connected with said vessels, a rheostat having contacts in position to engage the liquid in said stand-pipe, and an electrical instrument in circuit with said rheostat for registering a function of said variable.

14. The combination with a gas holder, of a weight-actuated member, means operated by said holder for controlling the amount of weight applied to said weight-actuated member, and means operated by said weight-actuated member for indicating the position of said holder.

15. The combination with a gas holder, of an electrical rheostat, weight-actuated means operated by said holder for varying said rheostat, and an instrument in circuit with said rheostat for registering movements of said holder.

16. The combination with a gas holder, of a flexible member connected with said holder and suspended in upright position, weight-actuated means for receiving the lower end of said flexible member, and registering mechanism controlled by said weight-actuated means for registering movements of said holder.

17. The combination with a gas holder, of a weight-actuated device disposed adjacent said holder, means operated by movements of said holder for varying the weight applied to said weight-actuated device, an electrical circuit having an instrument therein for registering movements of said holder, and means operated by said weight-actuated device for varying said electrical circuit to cause variations in the indications of said instrument.

18. The combination with a member arranged to move as a function of a variable quantity, of a weight-actuated member controlled by said first-named member by adding and subtracting weight to said weight-actuated member in proportion to the variations in magnitude of said variable quantity, and means controlled by the movements of said weight-actuated member for registering a function of said variable quantity.

In testimony whereof I have signed my name to this specification on this 20th day of December, A. D. 1926.

FRANCIS A. FURLONG.